United States Patent [19]
Lodge

[11] 3,755,255
[45] Aug. 28, 1973

[54] POLYAMIDES HAVING IMPROVED DYEABILITY PREPARED FROM AROMATIC CARBOXYLIC DISULFONATED COMPOUNDS

[76] Inventor: John Ewart Lodge, c/o ICI Fibres Limited, Pontypool, England

[22] Filed: June 9, 1971

[21] Appl. No.: 151,554

Related U.S. Application Data

[63] Continuation-in-part of Ser. No. 764,322, Oct. 1, 1968, abandoned.

[52] U.S. Cl. .................. 260/49, 8/178, 260/65, 260/785 C, 260/507 R, 260/537 S
[51] Int. Cl. ............................................. C08g 20/20
[58] Field of Search ............. 260/47 CZ, 78, 785 C, 260/65, 49

[56] References Cited
UNITED STATES PATENTS

| | | | |
|---|---|---|---|
| 3,542,743 | 11/1970 | Flamand | 260/78 |
| 3,296,204 | 1/1967 | Caldwell | 260/49 |
| 3,142,662 | 7/1964 | Huffman | 260/78 |

*Primary Examiner*—William H. Short
*Assistant Examiner*—L. L. Lee
*Attorney*—Thomas J. Morgan, Stephen D. Murphy and Robert J. Blake

[57] ABSTRACT

Basic dye affinity for polyamides is improved by interpolymerizing defined aromatic carboxylic disulphonated compounds with conventional polyamide monomer.

5 Claims, No Drawings

POLYAMIDES HAVING IMPROVED DYEABILITY PREPARED FROM AROMATIC CARBOXYLIC DISULFONATED COMPOUNDS

The present invention which is a Continuation-in-Part of copending application Ser. No. 764,322 filed Oct. 1, 1968, now abandoned, relates to synthetic linear polyamides or copolyamides containing sulphonated benzene rings in their molecular structure and also to shaped artIcles made therefrom.

It has long been known to prepare linear polyamides or copolyamides by polycondensation of diamines and dicarboxylic acids or of aminocarboxylic acids. Such polyamides, for instance polyhexamethylene adipamide, have for many years been prepared and melt spun to produce yarns for the manufacture of various types of articles such as fabrics.

It will be appreciated that the above-mentioned polycondensation reactions leave free carboxyl and amine end goups on the ends of the polymer molecules and the affinity of such groups for certain types of dyestuffs is made use of in the dyeing of polyamide yarns. Clearly, the greater the proportion of such free end groups in the polyamide the greater will be its affinity for the dyes. The maximum proportion of said end groups is, however, limited by the need to obtain polymer molecules of suitable length for obtaining desirable processing and fiber properties.

Attention has been given to ways of increasing or, conversely, of decreasing the affinity of such polyamides for dyestuffs by the introduction of groups other than amine or carboxyl groups, with increased affinity of resistance to dyestuffs, into, or onto the ends of, the polymer molecule. In the latter case, amine or carboxyl end groups are replaced by said other groups.

One of the reasons for changing the dye-affinity of polyamides is that yarns of different affinities may be combined in a fabric and when said fabric is dyed the different yarns will take up dye or dyes to different extents, so producing color pattern in said fabric.

A convenient group for promoting resistance to acid dye-stuffs and affinity for basic dyestuffs in this way is the sulphonic acid group, $SO_3H$, which is much more acidic than the carboxyl group.

$SO_3H$ groups may be affixed to the ends of polymer molecules by reacting free $NH_2$ groups, at some stage in the manufacture of the polyamide, with compounds of the form $COOH.R'Y-SO_3M$. $R'$ is for instance, a $-CH_2-$ group, w ich may or may not be present. M is a group which replaces the acidic H of the $SO_3H$ to form an inactive salt-group and Y is for instance a benzene ring. This leaves only the carboxyl group free to react with an amine group to form a CONH link with the polymer molecule. When the polymer is later immersed in water (during dyeing) the $SO_3M$ group is ionized to form a free $SO_3H$ group.

The increased basic-dye affinity and resistance to acid dyestuffs of such polymers is very useful but is limited by the proportion of end groups per polymer molecule, which in turn is limited by the necessity of forming suitable long molecules. Said dye affinity can be increased in two ways: a) by increasing the number of $SO_3M$ groups at molecule ends, or b) by including free $SO_3M$ groups along the length of the polymer molecule.

Method a) can be performed by the use of compounds of the form $COOH.R'-Y-(SO_3M)_n$ where Y is for instance a benzene ring and n is more than 1.

Method b) can be performed by the use of bifunctional compounds of the form $(COOH.R')_2-Y-(SO_3M)_n$. The two COOH groups form CONH groups with amine groups thus linking the $R'_2-Y-(SO_3M)_n$ into the polymer molecule.

Applicants have now found a particularly desirable class of disulphonated compounds which can be used for increasing the affinity of linear polyamides for basic dyestuffs and decreasing their affinity for acid dyestuffs.

The disulphonates of the class of the present invention are defined by the general formula which is as follows:

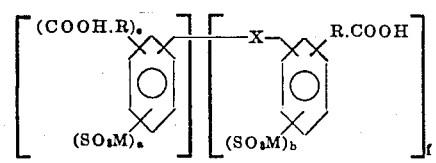

wherein when $f = 1$ then $a = 1$, $b = 1$ and $e = 1$;
and when $f = 0$ then $a = 2$ and $e = 1$ or 2.

$x$ is a bridge member selected from the group consisting of $(CH_2)_n$ where $n = 1$ to 10, $-O-(CH_2)_n-O-$ where $n = 2$ to 10,

$-CH=CH-$ and $-O-$;

M is a monovalent metal and preferably sodium or potassium;

R is $(CH_2)_n-(O)_p$ where $n = 0$ to 10 and $p = 0$ to 0 to 1 with the condition that when $n$ is 0, p must be 0 and if $p$ is equal to 1, the oxygen must be attached to the benzene ring.

Hydrogen atoms of one or both of the benzene rings may be substituted by alkyl groups such as methyl, ethyl and the like. Applicants have indeed found that the presence of $-CH_2-$ groups attached to the ring, either in the form of such methyl groups etc. or in the position R in the aforesaid definition, facilitates the introduction of the two sulphonic groups into the moleculee. The presence of an oxygen atom attached to the benzene ring also facilitates introduction of the sulphonic groups.

One or more of the aforesaid disulphonated compounds or a mixture thereof with other sulphonated compounds may be introduced into the polyamide by addition to the polyamide-forming reagents or by addition at any suitable stage in the manufacture of the polyamide or copolyamide. Such compounds should be added in an amount equivalent to 0.25 to 25 molar percent of the polyamide-forming reagents and preferably 0.5 to 5 molar percent.

Preferably the disulphonates are made into salts with suitable diamines, which salts may be fully or partially polymerized before adding to the main polymerization mixture at any suitable stage.

Furthermore an excess of monocarboxylic disulphonate may be added to act as a viscosity stabilizer, either alone or in admixture with other known monocarboxylic viscosity stabilizers such as acetic acid.

If desired, of course compounds of the present invention having two COOH groups may be reacted with diamines of suitable carbon number to produce polyamides without forming such polyamides into copolyamides.

Accordingly the present invention comprises a process for the formation of novel polyamides or copolyamides wherein a disulphonated compound of the class as defined herein or a fully or partially polymerized slat thereof with a suitable diamine or amino carboxylic acid is added at any stage in the polymerization process in an amount equivalent to between 0.25 and 25 molar percent of the polyamide-forming reagents.

Examples of $\alpha - \omega$ aliphatic diamines which may be used for making polyamides of the present invention are:

Hexamethylene diamine
3-methylhexamethylene diamine
Tetramethylene diamine
Octamethylene diamine
1:6 diamine-6-methyl heptane Examples of $\alpha - \omega$ aliphatic dicarboxylic acids are:

Adipic acid
Beta-methyl adipic acid
Sebacic acid
Pimelic acid

Such amines and acids, including the disulphonated carboxylic acids of the present invention, may be reacted to form salts before polymerization takes place.

Of course any polyamide-forming derivatives of the basic raw materials may be used, under suitable conditions, such as esters or acid chlorides or amides of the acids for example. Furthermore mixtures of amines or acids or of their functional derivatives may be used.

Viscosity stabilizers, e.g., monobasic acids, including for example, monobasic acids of the disulphonates of the class herein defined, or amines, and other suitable additives such as pigments, plasticizers and the like can, of course, be added in the normal way.

The following examples are for illustration and in no way limitative of the invention.

EXAMPLE I

Preparation of Disodium 1 methyl 4 carboxy-benzene 2,6 disulphonate.

100 parts of sodium 5 carboxy 2 methyl sulphonate were added to 400 parts of sulphonic acid containing 20 percent by weight of free sulphur trioxide. The mixture was stirred for four hours at 204°C. The mixture was allowed to cool to 20°C and then poured into 700 parts of ice with stirring. The white precipitate produced was separated by filtration and dissolved in 300 parts of water at 70°C. To this solution was added 300 parts of a 30 percent by weight solution of sodium chloride based on total weight in water. The mixed solution was cooled to 0°C. and the white solid which separated removed by filtration and dried under vacuum at 90°C. to give 126 parts (80 percent) of disodium methyl 4 carboxy benzene 2.6 disulphonate dihydrate. Equivalent weight by titration with alkali; 376 (theoretical; 376). Found S:17.0 percent; calculated for $C_8H_6S_2O_8Na_2 2H_2 O$:17.0 percent.

Polymer preparation

In this example the disulphonated monocarboxylic acid was added in an amount such that it also acted as a viscosity stabilizer.

1860 grams of hexamethylene diammonium adipate, 56.4 grams disodium trimethyl 4 carboxy benzene 2,6 disulphonate dihydrate and 3000 grams of water were stirred together in an autoclave and heated to 205°C. during 1 hour, reaching a pressure of 200 pounds/sq. in. The temperature was then raised to 240°C. during 1 hour whilst the pressure was maintained (by a spring loaded escape valve). During the next (third) hour the pressure was allowed to fall to one atmosphere while the temperature was raised further to 275°C. the polymer finally being heated at 285°C for 35 minutes.

The resulting white polymer, which possessed a Relative viscosity of 32.3, was melt-spun under steam to give a yarn of 20 filaments. The latter were drawn to 3.4 times their original length to give a total denier of 70 and 30 percent extensibility.

Yarn properties 4,4'
RV 33.6 (RV = Relative viscosity: 8.4 percent solution; 90 percent aqueous formic acid; 25°C.)
AEG 48.5 (AEG = Amine end groups; gram equivalents/$10^6$ grams)
CEG 64. (CEG = Carboxyl end groups; gram equivalents/$10^6$ grams)

A hank of the yarn was immersed for 3 hours in 200 times its weight of a 0.5 percent aqueous solution of Acid Blue 45 (C. I. 63010) containing 1 percent of acetic acid, but was only lightly stained. The amount of dyestuff taken up was measured by dissolving 50 mg. of the yarn in 20 ml. of 40 percent sulphonic acid and measuring the optical density at 430 m$\mu$ in a Unicam S.P. 600 spectrophotometer. The dyestuff taken up by polyhexamethylene adipate yarn under the same conditions was 10 times as much.

EXAMPLE II

Preparation of Disodium 1,4 di Carboxymethoxy benzene 2,5 disulphonate 200 parts of 1,4 dicarboxymethoxybenzene were added to 550 parts of concentrated sulphonic acid. The stirred mixture was heated at 50°C. for 2 hours before pouring into 1,000 parts of iced water. The solid which deposited was separated by filtration and redissolved in (1000 parts) boiling water. To this solution was added 1000 parts of 30 percent by weight sodium chloride solution based on the total weight and the mixed solution cooled to 0°. The white solid which deposited was separated by filtration and dried at 60°C. under vacuum to give disodium 1,4 dicarboxymethoxy benzene 2,5 disulphonate, 160 parts. Equivalent weight by titration with alkali; 212. Theoretical; 215. Found S; 15.1 percent. Calc. for $C_{10}H_8O_{12}S_2Na_2$; 14.9 percent.

Polymer and Yarn Preparation 50 grams of hexamethylene diammonium adipate, 1.661 grams of disodium 1,4 dicarboxymethoxy benzene 2,5 disulphonate (1 molar percent) and 5.6 ml. of a 12.5 percent by weight aqueous solution of hexamethylene diamine based on the total weight (1 molar percent) were heated under an inert atmosphere in a Carius tube at 220°C for 3 hours. The polymer after cooling was transferred to an open tube under nitrogen and heated at 285°C. for 30 minutes to give a white polymer. The polymer was spun to give a 5 filament yarn which was cold drawn at a draw ratio of 4.5.

Yarn properties
RV 68
AEG 20
CEG 110

When dyed with Acid Blue 45 (C.I. 63010) as described in Example 1, the yarn absorbed 1/10 the amount of dye absorbed by unmodified polyhexamethylene adipamide. The yarn was dyed to a deep shade with Basic Orange 28.

EXAMPLE III

Preparation of Disodium 4,4' (dicarboxy methyl) diphenylether 2,2' disulphonate.

143 parts of 4,4'0 (dicarboxy methyl) diphenyl ether were added over 2 hours to 550 parts of concentrated sulphonic acid, with stirring. The solution so obtained was allowed to stand for 24 hours and then poured into 500 parts of water. On cooling to 20°C. a brown solid separated. This was removed by filtration and dissolved in 500 parts of water. To this solution was added 580 parts of 30 percent by weight sodium chloride solution based on the total weight and the mixed solution was cooled at 0°C. for 24 hours. White crystals deposited. These were separated by filtration and dried at 60°C. under vacuum to yield 90 parts of disodium 4,4' (dicarboxy methyl) diphenyl ether 2,2' disulphonate.

Equivalent weight by titration with alkali, 250; (Theorettical 246). Found S; 12.7 percent. Calc. for $C_6H_{14}O_{11}S_2Na_2$; 13.0 percent Polymer preparation 65.5 grams of hexamethylene diammonium adipate, 1.225 grams disodium 4,4'(dicarboxymethyl) diphenyl ether 2,2' disulphonate, (1 molar percent) 2.5 ml. of molar aqueous hexamethylene diamine and 1.25 ml. of molar aqueous acetic acid were sealed in a Carius tube in an inert atmosphere. The tube was heated at 220°C. for 3 hours. After cooling the polymer was removed and placed in an open tube under nitrogen at 285°C. for ½ hour. The resulting white polymer possessed the following properties.

RV 52.6
AEG 73.0
CEG 57.0

The polymer was spun to a 5 filament yarn and the yarn drawn to 4.5 times its spun length.

The yarn possessed the following properties.

RV 63
AEG 12
CEG 67

When dyed using the method described in Example I, the yarn is hardly stained by Acid Blue 45 (C.I. 63010). Polyhexamethylene adipamide yarn absorbed 15 times the quantity of dye.

The yarn was dyed to a deep shade when immersed in a 0.5% aqueous solution of Basic Orange 28 at pH 4.

What is claimed is:

1. A filament forming polyamide or copolyamide polymer which comprises the product obtained by the polycondensation of aliphatic diamines and alpha-omega aliphatic dicarboxylic acid reactants in the presence of amounts equivalent to 0.25 to 25 mol percent of the polymer forming reagents of an aromatic carboxylic disulfonated compound, said aliphatic diamines being selected from the group consisting of hexamethylenediamine, 3-methylhexamethylenediamine, tetramethylenediamine, octamethylenediamine, and 1:6-diamine-6 methylheptane, said alpha-omega aliphatic dicarboxylic acid being selected from the group consisting of adipic acid, beta-methyl-adipic acid, sebacic acid and pimelic acid, said aromatic carboxylic disulfonated compound having the following general formula:

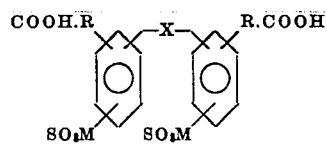

wherein X is a bridge member selected from the group consisting of $(CH_2)_n$ where -dissulfonate = 1 to 19, $-O-(CH_2)_n-O-$ where $n = 2$ to 10,

—CH=CH— and —O—;

M is monovalent metal;

R is $-(CH_2)_n-(O)_p-$ where $n = 0$ to 10 and $p = 0$ to 1 with the condition that when $n$ is 0, $p$ must be 0 and if $p$ is equal to 1, the oxygen must be attached to the benzene ring.

2. The product of claim 1 wherein the said disulfonated salt is 4,4'-di(carboxymethylene)diphenyl-ether-2,2'- disulfonate salt.

3. The product of claim 1 wherein M is sodium or potassium.

4. The product of claim 1 in the form of a filament.

5. The product of claim 1 wherein said polyamide is polyhexamethylene adipamide.

* * * * *